(12) United States Patent
Chiu

(10) Patent No.: US 6,804,336 B2
(45) Date of Patent: Oct. 12, 2004

(54) METHOD FOR E-MAIL FAX

(75) Inventor: Chien-Yuan Chiu, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 10/339,978

(22) Filed: Jan. 10, 2003

(65) Prior Publication Data

US 2004/0136513 A1 Jul. 15, 2004

(51) Int. Cl.⁷ ............................................. H04M 11/00
(52) U.S. Cl. ......................... 379/100.08; 379/100.09; 358/440
(58) Field of Search ................ 379/100.01, 100.02, 379/100.07, 100.08, 100.09, 93.24; 358/400, 403, 440, 407, 434; 709/206

(56) References Cited

U.S. PATENT DOCUMENTS

| 5,333,266 A | 7/1994 | Boaz et al. |
| 5,479,411 A | 12/1995 | Klein |
| 6,023,700 A | 2/2000 | Owens et al. |
| 6,230,189 B1 * | 5/2001 | Sato et al. ................... 709/206 |
| 6,330,309 B2 | 12/2001 | Toyoda et al. |
| 6,427,005 B2 | 7/2002 | Toyoda et al. |
| 6,477,244 B2 | 11/2002 | Toyoda et al. |

FOREIGN PATENT DOCUMENTS

EP           1081934 A2 *  7/2001  ............ H04N/1/00

OTHER PUBLICATIONS

Tzadikov et al. ; method and device for unified messaging; Apr. 5, 2001; WO 01/24463.*
Goodman; Routing 7–37 E–mail over an H323 network; Feb. 21, 2002; WO02/15016A1.*
Geshwind; A method urilizing . . . Internet terminals; Dec. 19, 1996; WO 96/4146.*
Rounsevell; A security apparatus . . . securing a telephone line; Feb. 4, 1999; WO 99/0584.*
Davidson, P., Brooktrout Technology Whitepapers, How to Buy Intelligent Fax Boards, www.brooktrout.com/whitepapers/html_pates/how_buy.html, Dec. 16, 2002.
Techland Group—Brooktrout PRI MVIP Fax Cards, www.techland.co.uk/index/faxcards_brooktrout_mvip, Dec. 16, 2002.
Intel® Telecom Products, DM/F240–T1 and DM/F300–E1, 24– and 3–Port High–Density Fax Boards, www.intel.com/network/scp/products/4377web.htm, Dec. 16, 2002.
GammaLink intelligent fax boards, Frequently Asked Questions, v4.0.5, Sep. 25, 1995, www.faqs.org/faqs/fax–faq/GammaLink/, Dec. 16, 2002.
GFi White Paper, Fax Servers, Why you need a fax server, www.gfi.com/faxmaker\wpnetworkfaxing.htm, Dec. 16, 2002.
Voice/Fax NMs, www.cisco.com/univercd/cc/td/doc/pcat.vone–P1.HTM, Dec. 16, 2002.
VSI–FAX® for Notes, The Pure Notes Fax Solution for the Enterprise, Esker® Software,.
GFi, Security & Messaging Software, http://support.gfi-.com/manuals/en/faxmaker/fex9/introductiontofaxrouting.htm, Dec. 16, 2002.

(List continued on next page.)

Primary Examiner—Melur Ramakrishnaiah
(74) Attorney, Agent, or Firm—Duane Morris LLP; Steven E. Koffs

(57) ABSTRACT

A method for communication, comprising the steps of: receiving an electronic mail message having content and having at least one destination with a top level domain name, routing the electronic mail message to a facsimile server if the top level domain name matches a predetermined domain name associated with the facsimile server, and forming and transmitting a facsimile signal representing the content of the electronic mail message from the facsimile server to a facsimile receiver.

32 Claims, 7 Drawing Sheets

OTHER PUBLICATIONS

Fax Solution for Lotus Note/Domino—Imecom group, Imecom, The Document Messaging Company™, www.imecominc.com/products/dms_for_notes.htm, Nov. 5, 2002.

TPC Fax, Send a Fax by e–mail, www.tpc.int/faxbyemail.html, Nov. 5, 2002.

Internet Fax Gateways/Servers, Dentel, See how VOP and silicon come together, www.iptelephony.org/GIP/vendors/fax/faxserver/, Nov. 5, 2002.

Fax Gateways for Lotus Notes/Comino, ServerFiles.com. www.32bit/com/Communications_&_collaboration_software/Fax_server_software/F . . . , Nov. 5, 2002.

Conexys, Total Communications Management, www.conexys.com/products_services_general/htm, Nov. 5, 2002.

eNode Clients for Web Services—Fax, A Simple SOAP-based Fax Client, www.enode.com/x/webwervices/fax.html, Jan. 10, 2003.

* cited by examiner

☐ Edit Server ○ Web

SERVER OANS19/TSMC

| Basics | Security | Ports | Server Tasks | Internet Protocols | MTAs | Miscellaneous | Transactional Logging | Administration | Fax |

▽ Fax for Notes Configuration
▽ Server Setting

General Config

| User Database Server | oans19/TSMC |
| Fax Administrator | fax/tsmc — 404 |

Inbound Routing

| Enable DTMF Routing: | Yes |
| Enable CSID Routing: | No |
| Enable Line Routing: | No |

Others

| Fax File Perfix: | Fax |
| Default Fax Number: | +886 (3) 6666668 — 402 |
| Domain Mailbox: | faxessmb.nsf |

Advanced Config

| Character for Dividing Extension Number: | # |
| Extending Time Per Extension Character: | 20 — 406 |

Outbound Routing

| Enable Least Cost Routing: | No — 408 |

Information

| User Limitation: | |
| Other Domain Name: | faxess |
| Temporary Path: | c:temp |

| Basics | Mail | Work/Home | Other | Miscellaneous | Certificates | Administration | Fax |

PERSON: CYCHIUD (CY CHIU)

Name

First name:
Middle initial:
Last name: CYCHIUD
User name: CYCHIUD(CY CHIU)
CYCHIUD/TSMC —502 — Email address could reference to this field
CYCHIUD Alternate name:

Short name/UserID: cychiud
Personal title:
Generational qualifier:
Internet password:

METHOD FOR E-MAIL FAX

FIELD OF THE INVENTION

The present invention relates to communications generally, and more specifically, to electronic mail and facsimile communications.

BACKGROUND

Facsimile (fax) communications are used extensively by businesses of all types. Based upon requirements, facsimile capability may be authorized for employees in a variety of departments within a company. Because facsimile transmissions enable export of data from the company, facsimiles provide a vulnerability with respect to potential loss of proprietary information. Improved ability to monitor facsimile transmissions is desired.

Another shortcoming of conventional facsimile systems is their inefficiency. The process of sending a fax often involves walking to a facsimile center, waiting for a fax machine to become available, and walking back to the sender's work area. This can be very time consuming. Further, the sender usually has a choice of either waiting for transmission of a fax to obtain a fax journal sheet before returning to his or her work area, or returning to the work area without a confirmation that the document has been transmitted successfully to the correct recipient. This means that the sender must choose between the more inefficient procedure of waiting by the fax machine for the fax journal sheet and the less secure procedure of leaving the fax machine without the fax journal sheet (before the transmission has completed successfully). A more efficient facsimile communication method is desired.

SUMMARY OF THE INVENTION

A method for communication, comprising the steps of: receiving an electronic mail message having content and having at least one destination with a top level domain name, routing the electronic mail message to a facsimile server if the top level domain name matches a predetermined domain name associated with the facsimile server, and forming and transmitting a facsimile signal representing the content of the electronic mail message from the facsimile server to a facsimile receiver.

BRIEF DESCRIPTION OF THE DRAWINGS

FIG. 4 is a diagram of an input form for defining an inbound facsimile number for a default facsimile receiver in the system of FIG. 1.

FIGS. 5 and 6 are diagrams of input forms for inputting address book information defining a direct inward dial number of a user.

DETAILED DESCRIPTION

Figure 1:
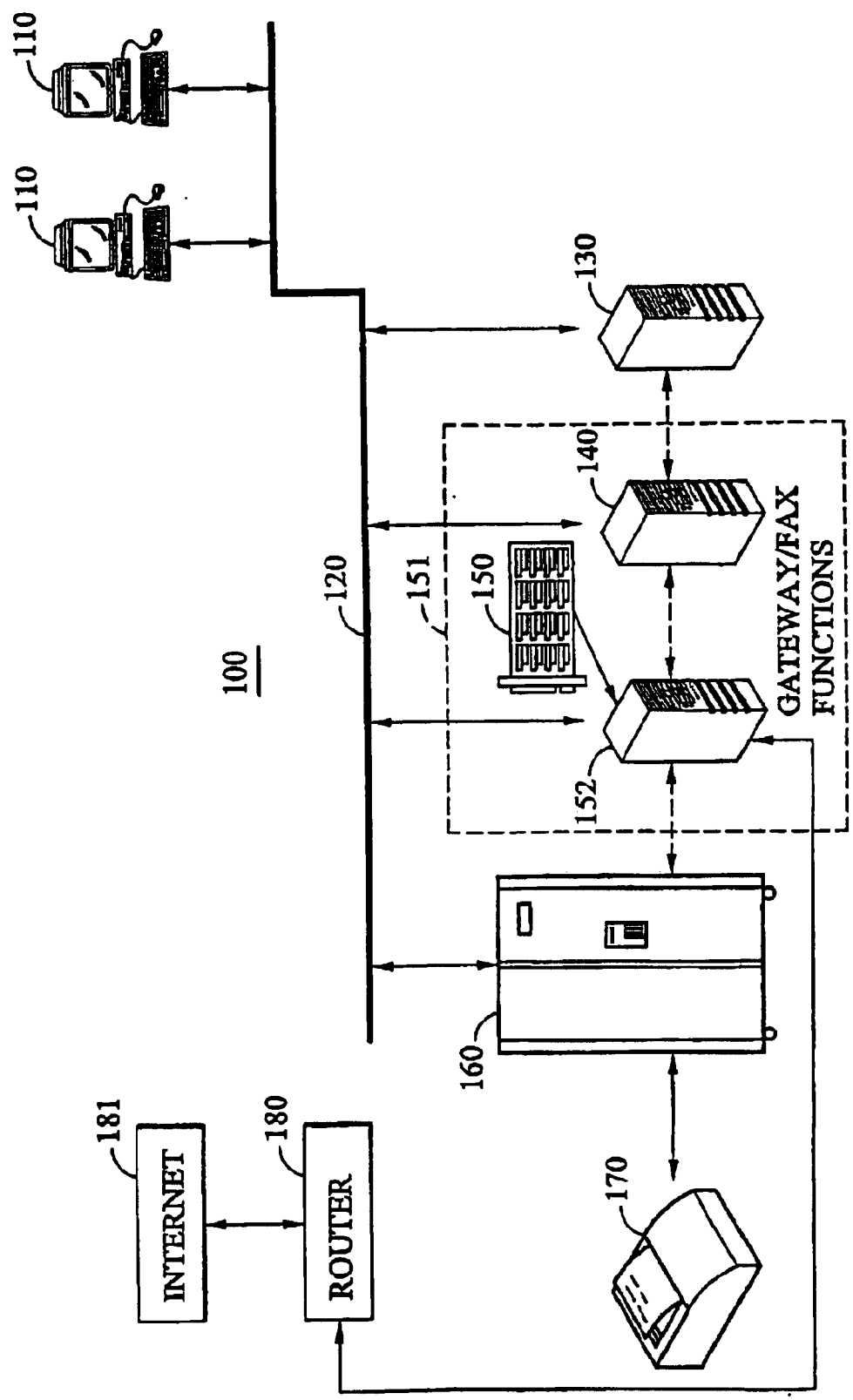
FIG. 1 is a diagram of an exemplary system for practicing the present invention.

FIG. 1 is a diagram of an exemplary system 100 according to one embodiment of the invention. The system includes a plurality of client computers 110. In some embodiments, the client computers 110 are desktop or laptop computers configured with a Pentium III or Pentium 4 class processor by Intel Corporation of Santa Clara, Calif., or any other processor capable of running the Windows operating system. The client computers 110 have an Internet Browser such as Internet Explorer by Microsoft Corporation of Redmond, Wash., or Netscape Navigator. The client computers 110 include an electronic mail (e-mail) application, such as Lotus Notes, by IBM Corporation of White Plains, N.Y. In some embodiments, the electronic mail application for initiating the electronic mail messages is a thin client application, which is executed within the browser.

In alternative embodiments, the client computers 110 may run a different operating system (such as MAC OS X by Apple Corporation of Cupertino, Calif., Linux or other variant of the UNIX operating system) and/or another e-mail application. Some alternative embodiments include "fat client" email applications.

Clients 110 are connected to a local area network (LAN) 120 which may use any of a variety of hardware architectures. For example, a Carrier Sense Multiple Access/Collision Detection (CSMA/CD) architecture according to IEEE 802.3u (100Base-T 100 Mbps baseband Ethernet over twisted pair cable) or IEEE 802.3z (1000Base-X 1000 Mbps Ethernet systems) may be used. Other LAN architectures may be used in alternative embodiments. LAN 120 includes a processor (not shown) running a network operating system, such as Netware by Novell, Inc. of Provo Utah, LANtastic by Artisoft, Inc. of Cambridge, Mass., or LAN Manager by Microsoft.

LAN 120 may have a number of connected servers, such as a web server, a file server, a database server and the like (not shown). Alternatively, a blade server may be provided, with each server blade dedicated to a respective function. In the exemplary embodiment, an electronic mail server 130 running a version of the UNIX operating system and Lotus Notes, and a gateway server 140 running a version of the UNIX operating system are provided.

Mail server 130 is in communication with gateway server 140. Although FIG. 1 shows a functional connection (in phantom) between mail server 130 and gateway server 140, it will be understood that the servers 130 and 140 may be connected indirectly by way of LAN 120, to which both are physically connected. The gateway server 140 may act as a proxy server and/or as a firewall. Mail server 130 has added functions, described below, which can be written in a variety of languages. For example, for a thin client e-mail system, JavaScript may be used.

A facsimile server 152 is provided. In some embodiments such as the embodiment shown in FIG. 1, a standalone facsimile server computer 152 is provided, including a fax board 150 such as an Intel® Dialogic® CPi/3000CT-E1 (Gammalink) Fax Board by the Intel Corporation of Santa Clara, Calif. Preferably fax board 150 is of a type capable of handling up to 30 concurrent faxes. In other embodiments, the facsimile server is one of a plurality of processes running in a shared computer, wherein the fax board 150 is installed in the same computer in which the facsimile server runs. For example, a facsimile server may be a program running in the gateway server 140, in which case the fax board 150 is installed in the gateway server. In such an embodiment, the gateway server 130, fax server 140 and fax board 150 are all within a single computer 151, as shown by the dashed box labeled, "gateway/fax functions. Alternatively, in a bladed server embodiment (not shown), the email server 130, gateway server 140 and facsimile server 152 are each implemented as a respective server blade.

Gateway server 140 is also connected to the Internet 181 by way of a router 180. The router 180 transmits Internet protocol (IP) packets over the Internet 181, and receives IP packets from the Internet.

The system has a private branch exchange (PBX) 160, a private telephone switching network used within the enterprise. Users of the PBX 160 share a certain number of outside lines for making telephone calls external to the PBX. In the exemplary embodiment, the PBX 160 is configured to support a combination of dual tone multiple frequency (DTMF) routing and Direct Inward Dial (DID) routing for incoming faxes. DTMF routing is based on the DTMF tones generated by a telephone handset on the calling fax machine 170, and can be used to identify a recipient 110. In the exemplary embodiment, the recipient's employee identification number is also used as the recipient's DTMF number for receiving faxes. The DTMF number can be appended after the regular fax number. The caller 170 dials a general fax number and waits until the call is answered. The fax card 160 then transmits a tone, after which the caller 170 or PBX 160 enters the DTMF routing number. The fax server 152 recognizes the DTMF number and uses it to identify the recipient of the fax. In the exemplary embodiment, a selected subset of the users have their own DID numbers for receiving faxes. For these users, DID lines are used to route the fax from the PBX, by way of the fax board 150, to the email user account of the recipient associated with the DTMF number. The PBX 160 converts the DID tones to DTMF and forwards them to the fax board 150 after the tone.

Although FIG. 1 shows a single unit for e-mail server 130, gateway server 140, fax server 152, and PBX 160, a hot spare may be provided for any of these servers, to ensure continuity of service in the event of a hardware failure.

Figure 2:
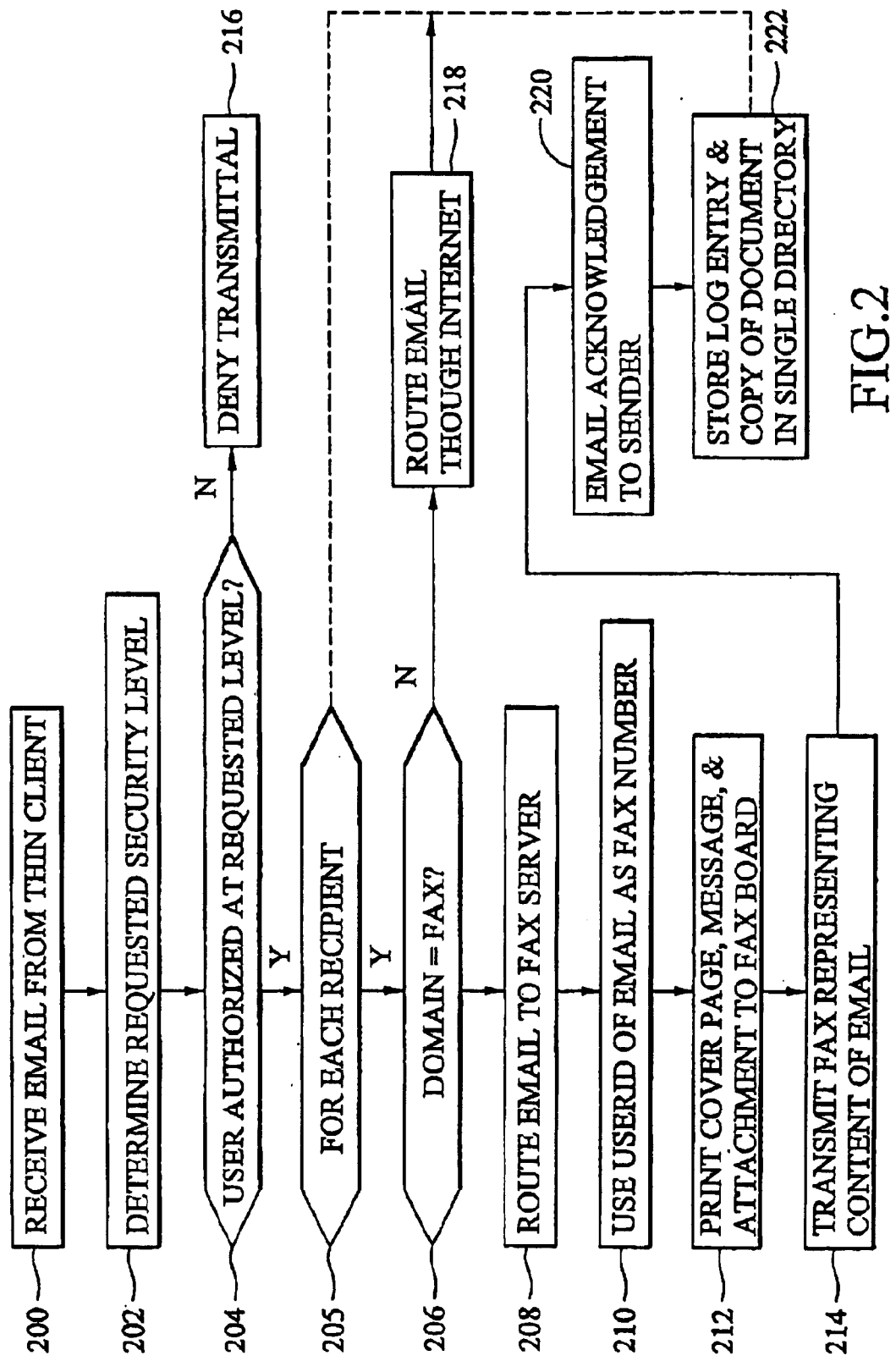
FIG. 2 is a flow chart diagram of an exemplary method according to the invention.
Figure 3:
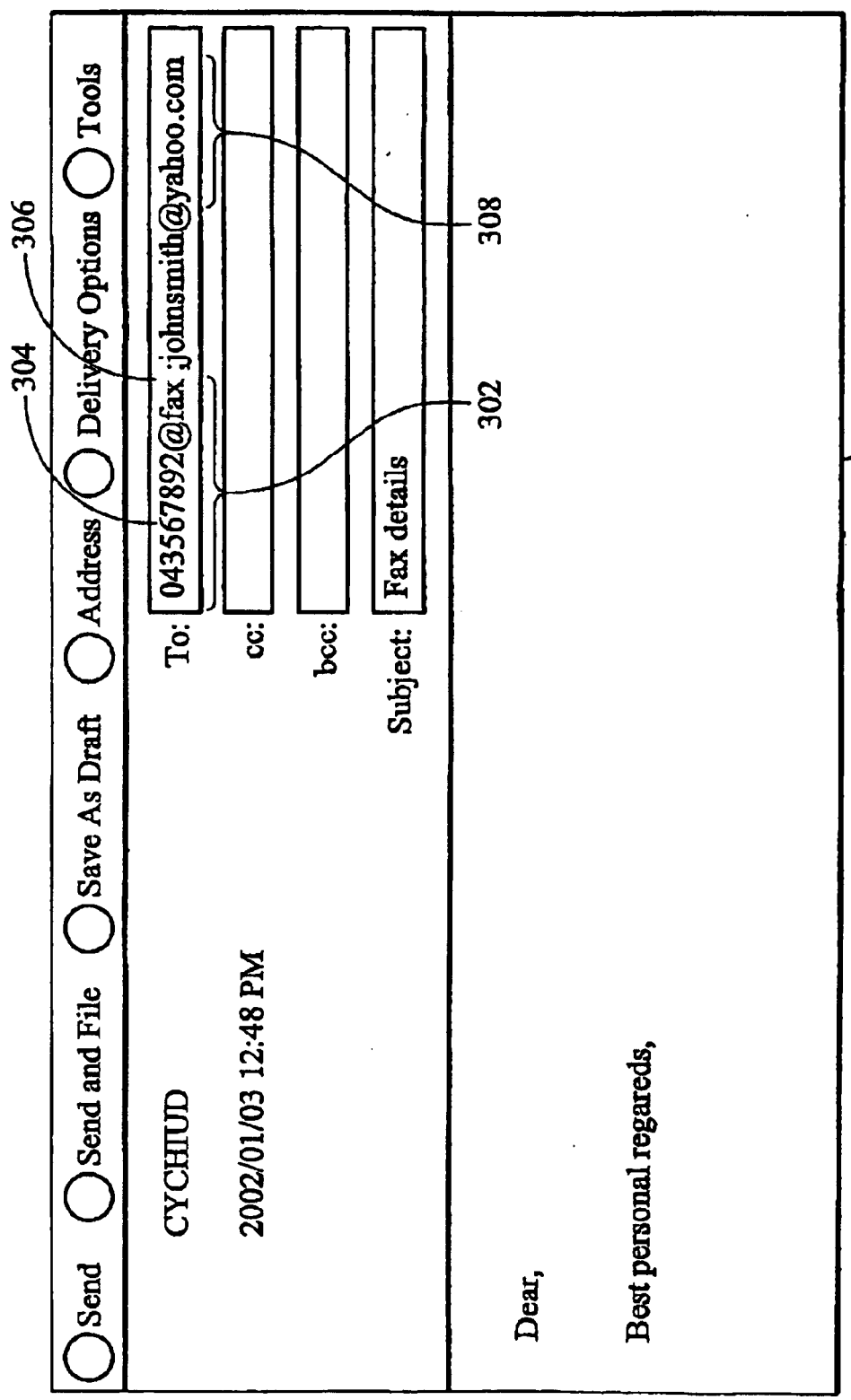
FIG. 3 is a diagram of a user e-mail input form for submitting a facsimile job.

FIG. 2 is a flow chart diagram of a process for transmitting a facsimile, alone or in combination with an electronic mail message, using an electronic mail interface, such as the exemplary interface shown in FIG. 3.

FIG. 3 shows an example in which the user wishes to send a facsimile copy of a message or document to a first recipient via fax, and an electronic copy of the same message or document to a second recipient via email. The exemplary system 100 allows the user to accomplish this by sending a single e-mail. The e-mail is prepared using an e-mail package, such as Lotus notes, which provides an input form 300. The e-mail may include only text, an attached file, or both. The user designates each recipient with an address comprising a domain name and a userid. For example, the number of a facsimile recipient is indicated by forming an address 302 having a userid field 304 and a domain name field 306. The facsimile userid field 304 contains the facsimile number of the recipient fax 170. The domain name field 306 for a facsimile destination contains a predetermined domain name, such as "fax" or "facsimile". Thus, in FIG. 3, the address "043567892@fax" is entered in the "To" field of the e-mail entry form 300, to send a message to a fax machine 170 having the number 043567892. The system designer may choose another domain name to designate a fax recipient, so long as that domain name does not correspond to the simple mail transport protocol (SMTP) address of any actual recipient to which anyone in the enterprise sends e-mail. FIG. 3 also shows a second internet address, having a domain name 308 "yahoo.com" and a userid "johnsmith". Because this address does not have the predetermined domain name "fax" corresponding to a facsimile recipient, an address of this form is entered to designate a normal e-mail recipient.

Although FIG. 3 shows the format for an address which is a DID fax number, the system also allows the user to input a DTMF fax number. For example, if the user wishes to send a fax to a recipient that uses DTMF routing for faxes, the recipient's DTMF number can be appended to the facsimile number, separated by a special character, such as the pound (#) sign. Thus, to send a fax to a recipient whose facsimile number is 0221234567, and whose DTMF number is 888, the sender enters the address 0221234567#888@fax in the "TO" field of e-mail input form 300.

Although not shown in FIG. 3, the user has the option to request a security level for the e-mail (for example, under the "delivery options" menu. A given system can be configured to establish a plurality of security levels, with each user authorized to transmit and receive documents only at or below the security level assigned to that user. Another delivery option not shown in FIG. 3 is the ability to specify either immediate delivery or scheduled delivery at a user input later time.

Referring again to FIG. 2, a method for communication is shown.

At step 200, the e-mail server 130 receives an electronic mail message 300 having content and having at least one destination with a top level domain name. A message may have a plurality of recipients, including any combination of local (internal) recipients who are users on the LAN 120, and/or external e-mail recipients, and/or facsimile recipients. If the sender has requested a later delivery at a scheduled time, e-mail server 130 places the communication in an outbox (queue), where it is retained until the scheduled time arrives. If any of the recipients is a client in the LAN 120, e-mail server 130 places a copy of the e-mail in the local client's mailbox.

At step 202, the e-mail server 130 determines the requested security level. This may be from an "explicit" request by the sender to assign a specific security level to the communication. Alternatively, the security level may be requested implicitly, by attaching a document or other file to the e-mail message, where the document has a security level associated with it.

At step 204, the e-mail server 130 identifies a security level associated with a sender of the electronic mail message, for example, by a table look up, or by checking the user's e-mail profile. The e-mail server 130 compares the security level associated with the sender to the requested security level of the electronic mail message. If the sender has a security level lower than the requested security level, then at step 216, the transmission is denied, and a notification of the denied fax request is issued to the sender. The system only transmits the communication to an external recipient if the security level associated with the sender is at least as high as the security level of the electronic mail message. In some embodiments, any request for facsimile transmission that is denied because of the sender's security level is automatically reported to a security officer, or automatically placed in a separate security log.

In alternative embodiments, an identification of the sender is compared to a list of authorized facsimile senders, and transmission of the communication is only allowed if the sender is one of the authorized facsimile senders.

If the user has the appropriate security level, the e-mail is then transmitted to the gateway server 140, which handles all communications with external fax and e-mail recipients on networks outside of the LAN 120. In the exemplary embodiment, a software program that invokes the Lotus Notes http service is used to transfer the communication to the gateway server 140.

At step 205, a loop is repeated for each external recipient.

At step 206, gateway server 140 examines the address of each external recipient and determines whether any of the recipient addresses 302 has the predetermined domain name 306 (e.g., "fax") reserved for facsimile transmissions. An agent resides in the gateway server 140. The agent inspects the domain 306 for each external e-mail address, and routes the message to the facsimile server 152 or the router 180, depending on the top level domain. The agent may be written in a variety of languages, such as visual basic, Notes Script or Javascript. If the top level domain name matches the predetermined domain name associated with the facsimile server, the electronic mail message will be routed to a facsimile server 152 as explained further below. If the domain is not the domain reserved for facsimile transmissions, step 218 is executed. At step 218, if the address has any other domain name except the predetermined domain name reserved for facsimile transmissions, the address is assumed to be an SMTP address, and the e-mail is routed through the Internet 181 by way of router 180.

At step 208, if there is at least one recipient having the domain name reserved for facsimile transmissions, the email is routed to the facsimile server 152. The facsimile server 152 determines a telephone number associated with each facsimile recipient based on a value of the user identification (userid) field. For example, in FIG. 3, the userid field 302 contains the number of the facsimile receiver 170.

At step 210, the userid 302 is provided to the fax board 150 of the facsimile server 152 as the fax destination number for the transmission to the recipient fax 170.

At step 212, the facsimile server 152 "prints" a cover page, the message, and any attachment to the fax board 150. The cover page includes the number in the userid field 304 and the security level. Optionally, additional associated information (if any) in the user's address book is added to the cover page. For example, if the sender's address book has an entry for a user containing the same facsimile number as the userid 304, the facsimile server 152 can retrieve the recipient's name, company, business address, and/or telephone number from the address book, and add this information to the cover page. The cover page also includes standard sender information, including the name, company name, address, and telephone number of the sender, and the like.

In some embodiments, if the sender's address book has entries for more than one individual associated with the same facsimile number as the userid 304, the facsimile server presents the sender with a list of each individual associated with the facsimile number, and prompts the sender to select one or more recipient names to be added to the cover page. In other embodiments, if the sender's address book has entries for more than one individual associated with the same facsimile number as the userid 304, no recipient name is added to the cover page. In other alternative embodiments, if the sender's address book has entries for more than one individual associated with the same facsimile number as the userid 304, all of the individuals associated with that facsimile number are listed on the cover page as recipients.

In some embodiments, the message is always included on the cover page. In other embodiments, the message is always included on a separate page from the cover. In other embodiments, the sender is given a choice between including the message on the cover page or on a separate page.

The attachment content is printed to the fax board 150 using the default application for the file type of each file. For example, if the attachment is a file with a standard DOS or Windows type extension (e.g., .doc, .xls, .pdf, .txt or the like), the attachment is printed to the fax board using the default application.

At step 214, the fax board 150 provides a facsimile signal representing the content of the electronic mail message from the facsimile server 152 to the facsimile receiver 170 by way of the PBX 160. Although FIG. 1 shows a dedicated fax machine 170, in alternative embodiments, the facsimile receiver may be a multi-function peripheral system (not shown), or a computer equipped with a fax modem or a fax board (not shown).

Some embodiments optionally include a step 220 for automatically transmitting an electronic mail acknowledgement to a sender of the electronic mail message when transmission of a fax is completed. In these embodiments, the e-mail facility monitors the handshaking between the facsimile system 151 (either the facsimile server 152, if present, or the gateway server 140, if the fax board 150 is contained in the gateway server) and the fax receiver 170. When the transmission is completed and the handshaking is complete, the e-mail server 130 issues an acknowledgement by e-mail to the sender. In one example, the Lotus Notes confirmation of receipt function is used to generate the acknowledgement. The e-mail server is provided with two different acknowledgement formats: one format for acknowledging e-mail transmission, and another format for acknowledging fax transmission.

Using the above described method, transmitting a facsimile communication is as fast and easy for the user as sending an e-mail. The user can send a document to both fax and email recipients at the same time, by sending a single e-mail message. A confirmation of transmission is obtained without requiring the user to wait by a fax machine. By managing his or her filing cabinet of incoming and outgoing fax e-mails, the user can organize his or her fax documents as easily and effectively as organizing e-mails in mailbox folders.

Some embodiments optionally include a step 222, wherein either the facsimile server 152 or the email server 130 stores a log record of each facsimile transmission. In the exemplary embodiment, a copy of the content is stored in the Lotus Notes server 130, in the same directory as the log record, and is associated with the log record. For example, a single log folder may be created to store this information for each day. Thus, all the log information for Dec. 10, 2002 could be stored in folder d:\logback\20021210 The copy stored in the Notes server is in the same format as the e-mail attachment. For example, if the attachment is a text document, then the copy stored in the notes server is a text document. Optionally, the copies may be compressed to conserve space on the e-mail server.

Optionally, analysis may be automatically (or manually) performed on any files containing text (e.g., .doc, .txt, .rtf, .pdf, and the like). For example, keyword searches may be performed for terms or project names within the attachment that indicate disclosure of proprietary material in the document. Any other desired type of text analysis may be performed. In some embodiments, a report is automatically generated listing any faxes which are flagged by the automated analysis as being suspicious or potential violations of company policy, including the log record information. The administrator of the system can then review the stored copy of the document. In other embodiments, each instance of a facsimile transmission which is identified as a potential violation results in automatic generation of an alarm (e.g., an urgent e-mail may automatically be sent to the security administrator, with a copy of the log record and a copy of the transmitted document attached.)

In some embodiments, if the attachment is in an image format (e.g., GIF, TIFF, JPEG), optical character recognition is automatically performed, to allow analysis of any text contained therein.

The logging and analysis facility improves the security of the organization by providing a means to immediately detect use of the facsimile facilities for divulging proprietary information. This security is enhanced if users are only given access to send outgoing faxes by way of system 100, and not by inputting a document to an outgoing fax machine. (If a document to be transmitted is not in electronic format, the user would be required to scan the document into an image file.) This policy reduces or eliminates the ability of employees to export proprietary information by way of facsimile without detection. It also makes it easy to terminate outgoing facsimile access for an employee. The user's address book information is merely updated to reflect that the user is not authorized to transmit faxes.

FIG. 4 is a diagram of an input form 400 for the gateway server 140 and e-mail server 130. This form enables definition of incoming facsimile telephone numbers for a default fax machine for the company. This fax machine is not associated with any single user. In field 402, information is entered defining the default fax number and the default fax mailbox. Field 404 includes additional information defining the user database server and fax administrator. In an enterprise having a plurality of e-mail servers 130, field 404 provides the routing information used by the gateway server to route the incoming fax to the appropriate e-mail server containing the recipient's e-mail mailbox. The file containing the table of information shown in FIG. 4 is stored in the gateway server 140, and is referenced in the Notes.ini file thereof, so that gateway server 140 is directed to the table of FIG. 4 when it needs to determine routing for an incoming fax.

A field 406 allows specification of an optimal number of concurrent faxes to be processed by the gateway server 140, to optimize processor and memory usage. If the value "0" is input to field 406, then no limit is placed on the number of concurrent faxes. For example, using an IBM R6/RS6000 class server (p Series e-Server), it is optimal to allow up to 20 inbound faxes and up to 20 outbound faxes concurrently. In some embodiments, outgoing faxes are stored in memory as necessary to limit the total number of concurrent faxes (outgoing and incoming combined) to 20. In the event that more than 20 concurrent faxes are routinely in a queue to be processed in either direction, it is advantageous to add one or more additional servers to efficiently process the fax load. This input form of FIG. 4 also includes a 408 to enable or disable "least cost routing," which specifies the number of gateway servers 140 among which the pending facsimile transmissions are to be divided. The "least cost routing" parameter was typically used in a Notes configuration to allow a company to transmit all faxes over an IP network and breakout the fax at the destination with the lowest tariff. In the exemplary embodiment, the least cost routing parameter can also be used for load balancing. Thus, the field 408 is used to allow more than one gateway server to process concurrent faxes, so that each such gateway server can process the faxes at an optimal speed.

Figure 6:
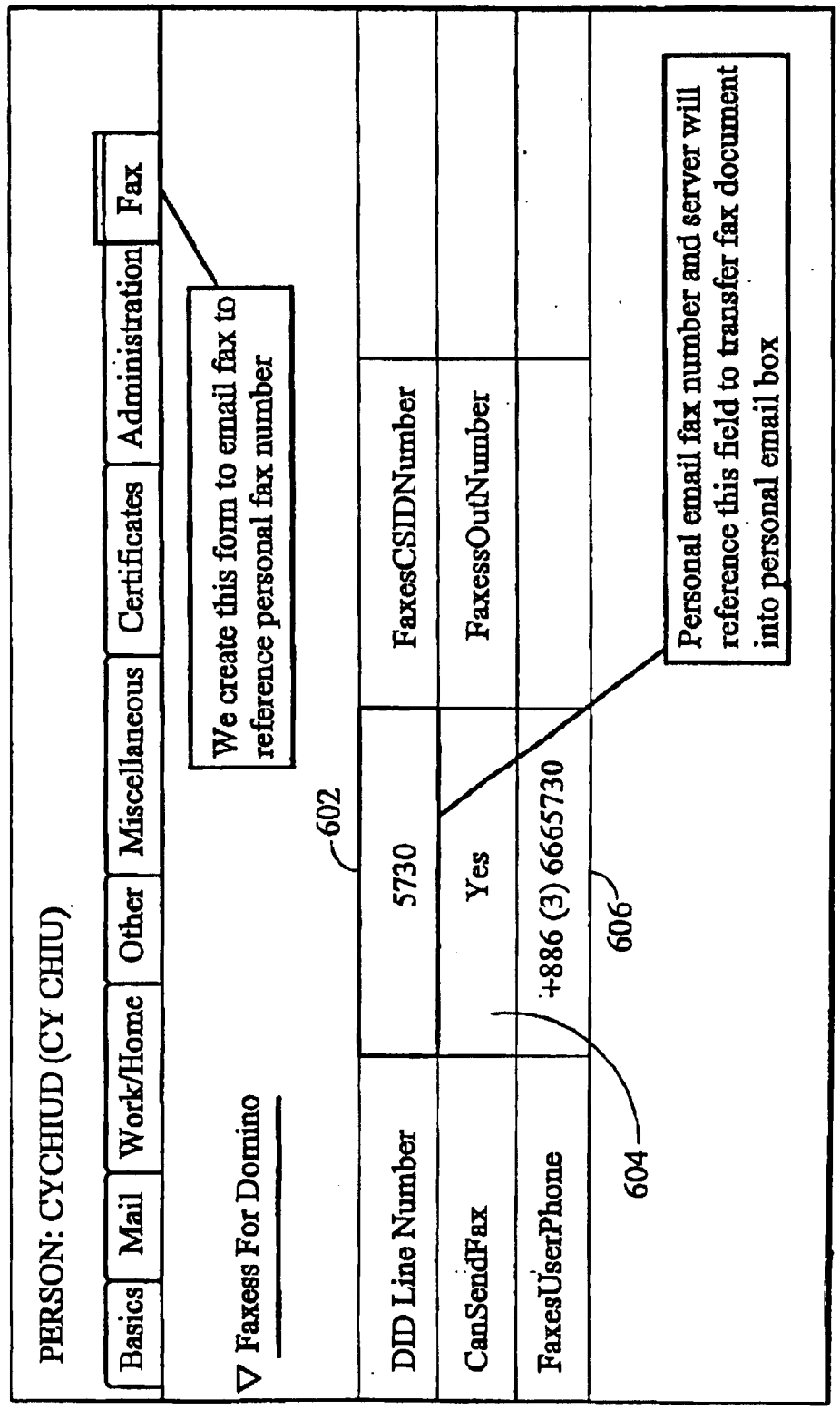
Figure 7:
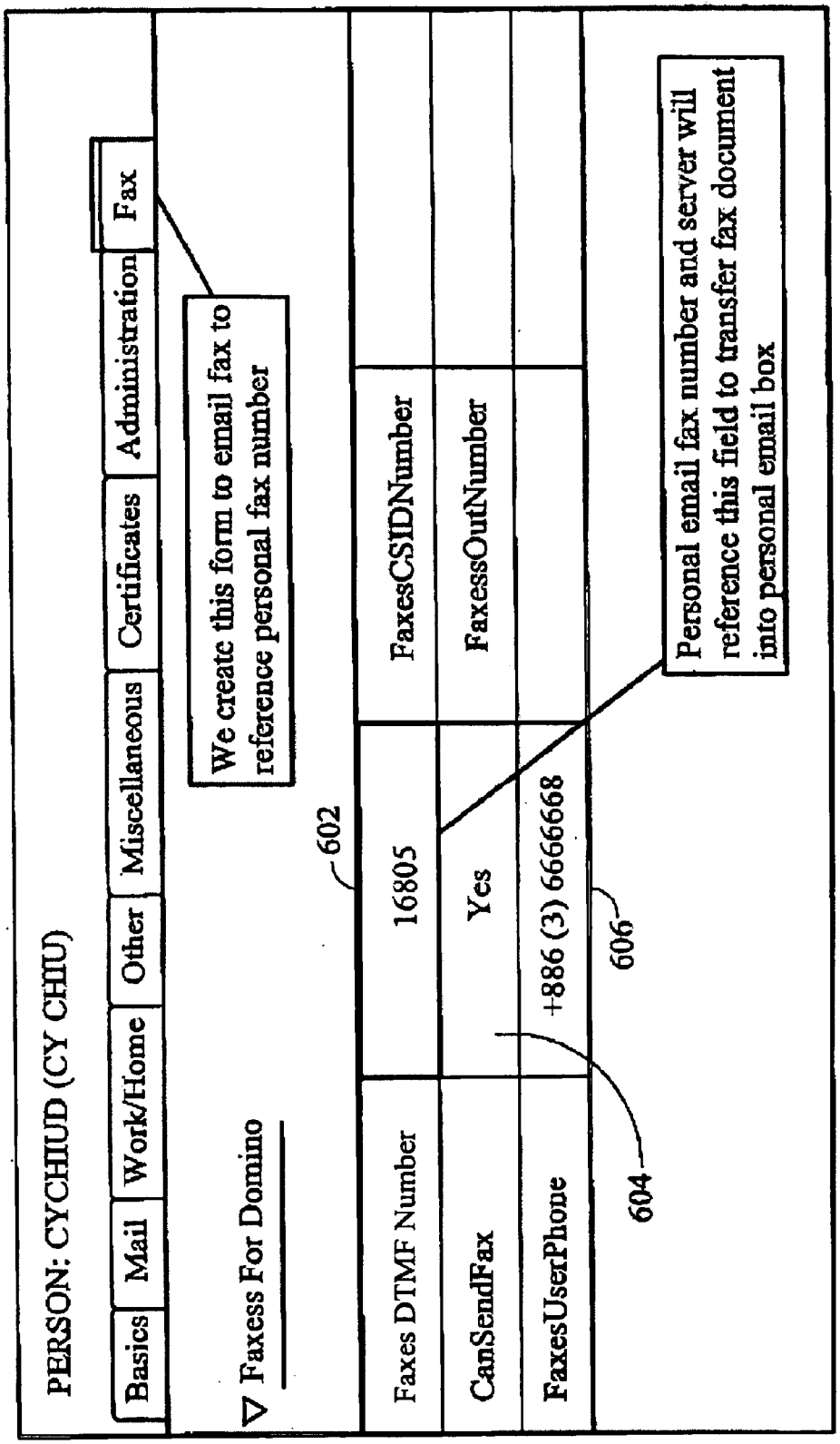
FIG. 7 is a diagram for inputting a DTMF code.

FIGS. 5 and 6 are input forms for defining a user to the system 100. In FIG. 5, an input form 500 for the user's address book allows definition of the user's name and e-mail address. FIG. 6 shows another input form 600 for inputting the user's fax data in the user's address book. This information is stored in the e-mail server 130 and gateway server 140, and is used to direct the fax e-mails received by server 130 into the appropriate recipients' e-mail inboxes. A field 602 specifies the user's DTMF or DID code which is used for the user's mailbox. In the exemplary embodiment, as shown in FIG. 7, the DTMF codes (which are the same as the recipients' employee ID numbers) have more digits (e.g., five) than the DID codes, which have four digits. Based on the number of digits, the gateway server 140 determines whether it has received an employee ID number or a DID number. The gateway server 140 can then perform the appropriate table look up to route the incoming fax to the correct individual. A field 606 captures the corresponding direct inward dial number that is used by external users to call the user. When an incoming facsimile transmission is directed towards a particular fax number associated with a user, the e-mail server 130 finds the address book having that fax number, and determines the mailbox of the user having that fax number. The file containing the table of information shown in FIGS. 5 and 6 is stored in the e-mail server 130, and is referenced in the Notes.ini file thereof, so that e-mail server 130 is directed to the table of FIGS. 5 and 6 when it needs to determine into which inbox an incoming fax e-mail is placed.

The exemplary method of handling incoming fax communications includes receiving a facsimile signal using either a DID number for a relatively small subset of the employee recipients, and DTMF routing is used for the majority of employee recipients, as described above. In other embodiments, ISDN or analog DID trunk routing may be used for all recipients. This method does not require the caller (sender of the fax) to separately enter the user's DTMF number after dialing the fax number. Other embodiments use DTMF routing for all recipients. In still other embodiments, OCR routing is used. OCR routing is based on recognizing the text on the incoming fax cover, such as the recipient's name.

The gateway server 140 converts the facsimile signal to a UNIX file. An agent in the gateway server 140 monitors the incoming facsimiles, periodically, for example every five seconds. When an incoming fax is received, instead of placing the fax in a shared file (shared between gateway server 140 and e-mail server 130), a backup copy is saved in gateway server 140 and a copy of the fax is saved directly in the recipient's e-mail inbox in e-mail server 130. The agent attaches the UNIX file to an electronic mail message, and forwards the message to the e-mail server 130. The e-mail server 130 converts the message to the Lotus Notes format and routes the electronic mail message to the inbox of the electronic mail recipient associated with the DID number.

In the case of an incoming fax converted to an e-mail, the "FROM" field of the message placed in the recipient's mailbox contains an address for which the userid is the facsimile number of the sender, and the domain name is the predetermined domain name reserved for facsimile communications. This is the same format that the user would input to designate a facsimile recipient in an outgoing e-mail. This tells the user (e-mail recipient) that the communication was originally transmitted by way of a facsimile machine. It also provides the user with the capability to use the standard "reply" function and e-mail input screen to generate a facsimile reply. In addition, if the user has established an automatic "out-of-office" reply for incoming emails, the system will automatically generate a reply e-mail that is routed to the facsimile server 152, and returned to the original fax sender by way of the fax machine 170.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A system, comprising:

an e-mail server that receives an electronic mail message having content and having at least one destination with a top level domain name, the e-mail server performing a security analysis on the content and automatically generating a notification if the security analysis detects a disclosure of proprietary information;

a gateway that routes the electronic mail message to a facsimile server, if the top level domain name matches a predetermined domain name associated with the facsimile server; and a fax board for forming and transmitting a facsimile signal representing the content of the electronic mail message from the facsimile server to a facsimile receiver.

2. The system of claim 1, wherein the destination includes a user identification field, and the gateway determines a telephone number associated with the facsimile receiver based on a value of the user identification field; and the fax board transmits the facsimile signal to the telephone number.

3. The system of claim 1, wherein:

the e-mail server stores a log record of the transmission and a copy of the content, wherein the stored copy of the content is associated with the log record.

4. The system of claim 3, wherein the e-mail server stores the log record and the copy of the content in a single directory.

5. The system of claim 1, wherein the e-mail server automatically transmits an electronic mail acknowledgement to a sender of the electronic mail message when transmission of the facsimile signal is completed.

6. The system of claim 1, wherein the electronic mail message has a requested security level associated therewith, and:

the e-mail server identifies a security level associated with a sender of the electronic mail message and compares the security level associated with the sender to the requested security level of the electronic mail message, wherein the fax board only transmits the facsimile signal if the security level associated with the sender is at least as high as the security level of the electronic mail message.

7. The system of claim 1, wherein:

the electronic mail message has first and second destinations, the first destination having the predetermined top level domain name, the second destination having an address including domain name associated with an Internet address, the gateway routes a first copy of the electronic mail message to the facsimile server and a second copy of the electronic mail message to an email client via the Internet.

8. A method for communication, comprising the steps of:

(a) receiving an electronic mail message from a sender, the message having content and having at least one destination with a top level domain name, the destination including a user identification field;

(b) determining a telephone number associated with a facsimile receiver based on a value of the user identification field, if the top level domain name matches a predetermined domain name associated with the facsimile server;

(c) determining whether an address book of the sender contains two or more entries for two or more individuals associated with the telephone number;

(d) prompting the sender to select a recipient name from among the two or more individuals;

(e) routing the electronic mail message to the facsimile server; and (f) forming and transmitting a facsimile signal representing the content of the electronic mail message from the facsimile server to the facsimile receiver at the telephone number, the facsimile signal including data for forming a cover page including the recipient name.

9. A method according to claim 8, further comprising:

determining a DTMF routing number associated with a facsimile receiver and a recipient based on the value of the user identification field.

10. The method of claim 8, further comprising:

automatically transmitting an electronic mail acknowledgement to a sender of the electronic mail message when step (e) is completed.

11. The method of claim 8, wherein the electronic mail message is generated by a Notes client.

12. The method of claim 8, wherein step (a) includes receiving the electronic mail message from a thin client application operating within a browser.

13. The method of claim 8, wherein:

the electronic mail message has first and second destinations, the first destination having the predetermined domain name, the second destination having an address including a domain name associated with an Internet address, a first copy of the electronic mail message is routed to the facsimile server in step (e), the method further comprising:

routing a second copy of the electronic mail message to an email client via the Internet.

14. The method of claim 8, wherein step (d) includes displaying a list containing names of each individual for which an entry in the sender's address book is associated with the telephone number.

15. The method of claim 8, further comprising using an employee identification number of the recipient as the DTMF routing number.

16. The method of claim 8, wherein the user identification field contains a telephone number and the DTMF routing number, separated by a predetermined character.

17. A method for communication, comprising the steps of:

(a) receiving an electronic mail message having content and having at least one destination with a top level domain name;

(b) routing the electronic mail message to a facsimile server, if the top level domain name matches a predetermined domain name associated with the facsimile server;

(c) forming and transmitting a facsimile signal representing the content of the electronic mail message from the facsimile server to a facsimile receiver;

(d) performing a security analysis on the content; and (e) automatically generating a notification if the security analysis detects a disclosure of proprietary information.

18. The method of claim 17, further comprising:

storing a log record of the transmission;

storing a copy of the content; and associating the stored copy of the content with the log record.

19. The method of claim 18, wherein:

the log record and the copy of the content are stored in a single directory.

20. The method of claim 17, wherein the electronic mail message has a requested security level associated therewith, and the method further comprises:

identifying a security level associated with a sender of the electronic mail message; and comparing the security level associated with the sender to the requested security level of the electronic mail message, wherein the facsimile signal is only transmitted if the security level associated with the sender is at least as high as the security level of the electronic mail message.

21. The method of claim 17, further comprising:

comparing an identification of the sender to a list of authorized facsimile senders; and only allowing transmission of the facsimile signal if the sender is one of the authorized facsimile senders.

22. The method of claim 17, wherein the security analysis comprises a keyword search.

23. The method of claim 17, further comprising:

identifying a security level associated with the message; and comparing a security level associated with the sender to the identified security level of the electronic mail message, wherein the facsimile signal is only transmitted if the security level associated with the sender is at least as high as the security level of the electronic mail message.

24. The method of claim 17, wherein step (e) includes automatically generating and transmitting a message to a security administrator.

25. A computer readable medium encoded with computer program code, wherein when the computer program code is executed by a processor, the processor performs a method for communication, comprising the steps of:

(a) receiving an electronic mail message from a sender, the message having content and having at least one destination with a top level domain name, the destination including a user identification field;

(b) determining a telephone number associated with a facsimile receiver based on a value of the user identification field, if the top level domain name matches a predetermined domain name associated with the facsimile server;

(c) determining whether an address book of the sender contains two or more entries for two or more individuals associated with the telephone number;

(d) prompting the sender to select a recipient name from among the two or more individuals;

(e) routing the electronic mail message to the facsimile server; and (f) forming and transmitting a facsimile signal representing the content of the electronic mail message from the facsimile server to the facsimile receiver at the telephone number, the facsimile signal including data for forming a cover page including the recipient name.

26. A computer readable medium according to claim 25, further comprising:

a DTMF routing number associated with a facsimile receiver and a recipient based on a value of the user identification field.

27. The computer readable medium of claim 25, wherein the method further includes storing a log record of the transmission and a copy of the content, and the stored copy of the content is associated with the log record.

28. The computer readable medium of claim 27, wherein the log record and the copy of the content are stored in a single directory.

29. A computer readable medium encoded with computer program code, wherein when the computer program code is executed by a processor, the processor performs a method for communication, comprising the steps of:

(a) receiving an electronic mail message having content and having at least one destination with a top level domain name;

(b) routing the electronic mail message to a facsimile server, if the top level domain name matches a predetermined domain name associated with the facsimile server;

(c) forming and transmitting a facsimile signal representing the content of the electronic mail message from the facsimile server to a facsimile receiver;

(d) performing a security analysis on the content; and (e) automatically generating a notification if the security analysis detects a disclosure of proprietary information.

30. The computer readable medium of claim 29, wherein the method further comprises automatically transmitting an electronic mail acknowledgement to a sender of the electronic mail message when transmission of the facsimile signal is completed.

31. The computer readable medium of claim 29, wherein the electronic mail message has a requested security level associated therewith, and the method further comprises:

identifying a security level associated with a sender of the electronic mail message; and comparing the security level associated with the sender to the requested security level of the electronic mail message, wherein the facsimile signal is only transmitted if the security level associated with the sender is at least as high as the security level of the electronic mail message.

32. The computer readable medium of claim 29, wherein the method further comprises:

comparing an identification of a sender of the electronic mail message to a list of authorized facsimile senders; and only allowing transmission of the facsimile signal if the sender is one of the authorized facsimile senders.

* * * * *